United States Patent Office 3,832,162
Patented Aug. 27, 1974

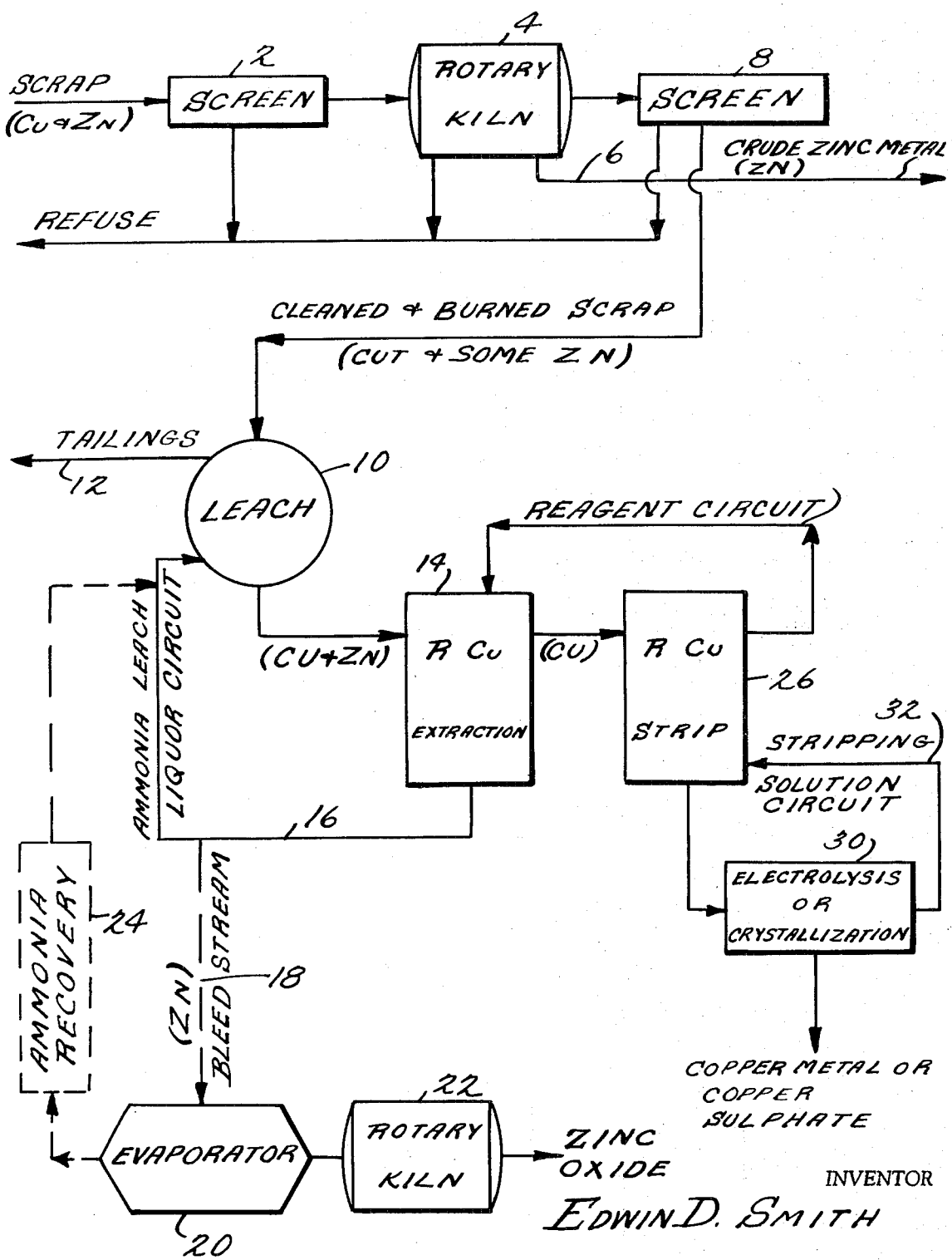

3,832,162
RECOVERY OF COPPER AND ZINC FROM
AUTOMOBILE SCRAP
Edwin D. Smith, 1951 Wallace Road,
Allison Park, Pa. 15101
Filed Mar. 26, 1969, Ser. No. 810,670
Int. Cl. C22b 13/04, 15/10
U.S. Cl. 75—63    10 Claims

ABSTRACT OF THE DISCLOSURE

Copper and zinc are recovered from scrap derived from automobiles by first removing the bulk of the ferrous materials, burning the organic material, separating the bulk of the zinc as liquid metal, contacting the residue with aqueous ammonia to leach out the copper and residual zinc, treating the ammoniacal solution with a water immiscible organic liquid containing a copper specific ion exchange reagent to separate the copper from the zinc, stripping the organic copper containing solution with aqueous liquid, and recovering the separated copper and zinc.

---

The present invention relates to enhancing the value of scrap refuse produced in the scraping of automobiles.

In the past copper has been recovered from selected scrap containing high concentrations, i.e. above 15% of copper by the use of liquid ion exchange techniques. Such processes, however, have never been applied to the scrap automobile industry wherein the percent of copper in the scrap is well below 15% and in fact there has never been developed a commercial process for the recovery of the miniscule amounts of copper present in automobile scrap.

It is an object of the present invention to develop an economical procedure for recovering copper from automobile scrap.

Another object is to recover zinc from automobile scrap.

Still further objects and the entire scope of applicability of the present invention will become apparent from the detailed description given hereinafter; it should be understood, however, that the detailed description and specific examples, while indicating preferred embodiments of the invention are given by way of illustration only, since various changes and modifications within the spirit and scope of the invention will become apparent to those skilled in the art from this detailed description.

The zinc present in automobile scrap is primarily present in die castings and the copper is primarily present as wire although some copper and zinc is present in the form of brass. Generally the amount of zinc in automobile scrap is about 2 to 4 times the amount of copper.

The normal procedure used in the automobile scrapping industry today is to chop up automobiles in a large piece of equipment very similar to a garbage disposal unit. This reduces the automobile to pieces of scrap metal, the largest in volume having roughly the dimensions of a basketball. From the chopper the metal is fed to an electromagnetic separator. Those pieces which are principally ferrous metal are picked up by the separator. What is left is presently being discarded as refuse of no economic value. It contains various amounts of zinc die castings, copper wire, brass, aluminum, plastics, insulation, upholstery fabric, grease, dirt and general crud.

For every 127 tons of scrap automobiles which is chopped up 100 tons is recovered as ferrous scrap in the magnetic separator. The balance (27 tons) contains 24 tons of crud, primarily organic matter and about 3.23 tons of non-ferrous metal. This 3.23 tons of metal in a typical automobile scrap contains 2.09 tons of zinc, 0.56 tons of copper, 0.53 tons of aluminum and 0.05 tons of stainless steel. Thus the copper is only about 0.4% of the total scrap. Even after removal of the ferrous materials the copper is not over 5% of the total scrap and is generally over 1%. The zinc is usually 3 to 15% of the scrap after removal of the ferrous materials.

The invention will be understood best in connection with the accompanying drawing wherein the single Figure is a flow sheet of the process of the invention.

Referring more specifically to the drawing automobile scrap from the electromagnetic separation of ferrous metals passes over screen 2 to remove loose dirt, grease and other foreign matter. The scrap is then passed to a region where the organic matter is burned. Preferably this is done in a rotary kiln 4 regulated to maintain a temperature sufficiently high to melt any pure zinc and burn off the organic matter, but not sufficiently high to melt the aluminum. Thus the kiln temperature is preferably kept at 420 to 650° C. Air is introduced to burn the organic matter. Various conventional fuels such as No. 2 fuel oil can be employed in addition if necessary to maintain the temperature. The heat generated in the rotary kiln can be used as a source of heat later in the process by use of appropriate heat exchangers. The molten zinc containing a small amount of ash and other impurities is drawn off through line 6 and recovered and sold as is to a smelter. Over 50% of the zinc is recovered in this fashion. The residence time of the scrap in the kiln is usually from 1 to 10 minutes. The scrap from which the bulk of the zinc has been removed is passed onto a second screen 8 to remove any entrained ash.

The thus, cleaned and burned scrap is dumped into a leach tank 10 and treated with an aqueous ammonia leach solution. The leach liquor preferably also contains ammonium carbonate to help maintain the equilibrium and aid in recovering the zinc. The leach liquor can contain, for example, from 10 grams of ammonia per liter up to the saturation point. When ammonium carbonate is also present it can be used in an amount of 10 grams per liter up to the saturation point. The pH of the leach liquor can range from 8 to 11, but to get effective leaching without excessive ammonia loss due to volatilization, the pH should be in the range of 9 to 10. Other water soluble ammonium compounds can be present providing the appropriate pH is maintained. The leach tank is periodically shut down to remove tailings (12) and another leach tank inserted into the system.

The tailings contain the aluminum and other residues other than copper and zinc. If it is desired to recover the aluminum from the tailings this can be accomplished by treating the tailings with either concentrated hydrochloric acid to form aluminum chloride or with sodium hydroxide to form sodium aluminate.

The ammoniacal leach solution containing the copper and remaining zinc in solution is then pumped to a liquid ion exchange circuit comprising a copper extraction unit 14 containing a copper specific ion exchange reagent in a water immiscible organic solvent. While there can be employed a single copper extraction unit 14 preferably there are employed 2 or more units in series with the aqueous ammoniacal copper solution passing in countercurrent flow to the organic solvent solution. The concentration of the copper in the leach liquor at time of entry into the ion exchange circuit can be from 1 gram per liter up to the saturation point. The copper is extracted by the copper specific liquid ion exchange reagent while the zinc remains in the ammoniacal aqueous solution. The aqueous ammoniacal solution is recirculated via line 16 to leach tank 10. Continuously (or intermittently if desired) a percentage of the leach liquor, e.g., 10% is removed from line 16 as a bleed stream through line 18 to prevent a build up of zinc concentration in the ammoniacal liquor. The liquor in the bleed stream is partially evaporated (preferably 20%) in evaporator 20 to remove essentially all of the ammonia and precipitate zinc oxide and zinc carbonate. A slurry of the solid zinc compounds is filtered and the filtered solids are dried in a rotary kiln 22 at a temperature sufficiently high, e.g., 325° C., to obtain essentially pure zinc oxide which can be sold to a smelter or other user of zinc. The hot gases formed in rotary kiln 4, if desired, can be used as the source of heat for rotary kiln 22 and/or evaporator 20 or any other source of heat can be used. If it is desired to heat leach tank 10 to hasten dissolution there can be used some of the heat left over from heating rotary kiln 22. The ammonia and ammonium carbonate evaporated in evaporator 20 is recovered in a condenser 24 by cooling and absorbed in water in a packed column tower at a concentration of 30 grams per liter total ammonia and returned to the leach circuit. Additional make up ammonia and ammonium carbonate (if employed) can be added as needed to the leach tank 10 periodically (or continuously).

The volume ratio of the organic phase to aqueous phase in the extraction unit 14 is usually 0.5 to 3 organic to 1 aqueous, but can be varied more widely if desired. The copper containing reagent organic solution after the countercurrent extraction in extraction unit 14 is pumped to a stripping circuit comprising stripping unit 26. While there can be employed a single stripping unit 26, there are preferably employed 3 or more units in series with the organic solvent solution passing in countercurrent flow to the aqueous stripping solution. The volume ratio of aqueous phase to organic phase in the stripping unit usually ranges from 0.5 to 2 aqueous to 1 organic, but this can be varied. The stripping solution which is strongly acidic, preferably with sulfuric acid, removes the copper values from the organic phase. The organic reagent phase with most of the copper removed is recirculated to the liquid ion exchange circuit unit 14 via line 28. The copper containing strip solution after leaving stripping unit 26 can then be treated by standard electrolysis to recover pure copper metal or can be recrystallized to recover copper sulfate as designated at 30. The strip solution is recirculated via line 32 to stripping unit 26.

The liquid ion exchange solution normally contains 5 to 20% by volume of the copper specific ion exchange reagent dissolved in the organic solvent, but this can be varied. The copper concentration in the organic solvent solution prior to stripping is usually 2 to 15 grams per liter, but this also can be varied. The copper concentration in the stripping solution after stripping is usually 30 to 55 grams per liter but can be varied. When electrolysis is employed to obtain pure copper metal a drop in copper concentration of the electrolyte occurs. The electrolysis does not work effectively much below 25 grams of copper per liter. For this reason the stripping solution always contains copper except for initial start up when it only contains sulfuric acid.

The concentration of acid in the stripping solution normally is from 150 to 300 grams per liter but this also can be varied. The concentration of copper in the recirculated stripping solution (spent electrolyte) is normally 25 to 50 grams per liter but can be lower if the copper is crystallized as copper sulfate for example.

While sulfuric acid is the preferred mineral acid there can also be used other mineral acids such as hydrochloric acid, nitric acid and hydrobromic acid.

There can also be employed any of the known copper specific organic ion exchange reagents. Thus there can be used hydroxy aliphatic oximes having the formula

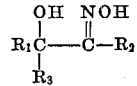

I where $R_1$ and $R_2$ are organic hydrocarbon radicals and $R_3$ is hydrogen or an organic hydrocarbon radical and 2-hydroxy benzophenoxime having alkyl, ethylenically unsaturated aliphatic, alkyl or ethylenically unsaturated aliphatic ether groups thereon. The copper specific reagents can be used alone or together. Typical examples of suitable copper specific reagents are found in Swanson Pat. 3,224,873; Swanson Pat. 3,284,501; Swanson Pat. 3,294,842 and Swanson Pat. 3,428,449. The entire disclosure of all of the Swanson patents is hereby incorporated by reference. Typical examples of suitable copper specific ion exchange reagents include 5,8-diethyl-7-hydroxydodecan - 6-oxime, 19-hydroxyhexatriaconta-9,27-diene-18-oxime, 5,10-diethyl - 8-hydroxytetradecane - 7-oxime, oximes of formula I where $R_1$ and $R_2$ are unsaturated hydrocarbon or branched chain alkyl of 6 to 20 carbons when $R_3$ is ether hydrogen or unsaturated hydrocarbon or branched chain alkyl of 6 to 20 carbon atoms. Thus $R_1$, $R_2$ and $R_3$ can be heptenyl, octenyl, decenyl, octadecenyl, ethyloctadecenyl, ethylhexyl, diethylheptyl, butyldecyl, butylhexadecyl, ethylbutyldodecyl, butylcyclohexyl, methylpentyl. These oximes usually have 14 to 40 carbon atoms. Other examples of reagents include 2-hydroxy-5-dodecylbenzophenoxime,
2-hydroxy-3'-methyl-5-ethylbenzophenoxime,
2-hydroxy-5-(1,1-dimethylpropyl)-benzophenoxime,
2-hydroxy-5-(1,1-dimethylethyl)-benzophenoxime,
2-hydroxy-5-octylbenzophenoxime,
2-hydroxy-5-nonyl-benzophenoxime,
2-hydroxy-2',4'-dimethyl-5-octylbenzophenoxime,
2-hydroxy-2',3',5'-trimethyl-5-octylbenzophenoxime,
2-hydroxy-3,5-dinonylbenzophenoxime,
2-hydroxy-4'-(1,10-dimethylethyl)-5-(2-pentyl)-benzophenoxime,
2-hydroxy-4'-(1,1-dimethylethyl)-5-(2-butyl)-benzophenoxime,
2-hydroxy-4-dodecyloxybenzophenoxime,
2-hydroxy-4'-(1,1-dimethylethyl)-5-methylbenzophenoxime,
2-hydroxy-4',5-bis(1,1-dimethylethyl)-benzophenoxime,
2-hydroxy-2',4',5'-trimethyl-5-octylbenzophenoxime.

The preferred copper specific reagents have a solubility of at least about 2% in a liquid, essentially water-immiscible organic solvent. The preferred solvents are liquid hydrocarbons or chlorohydrocarbons. Thus, there can be used aliphatic hydrocarbon solvents such as petroleum-derived liquid hydrocarbons, either straight chain or branched such as kerosene and fuel oil, aromatic solvents such as benzene, toluene and xylene, alkyl substituted aromatic hydrocarbons derived from petroleum processing. Typical chlorinated hydrocarbons include 1,1,2-trichloroethane, tetrachloroethane, etc.

Unless otherwise indicated all parts are by weight.

EXAMPLE 1

Using the procedure described in connection with the drawing the residue from the electromagnetic separation of ferrous metal from scrapped automobiles was screened and fed to kiln 4 at an hourly rate of 10,000 pounds. The scrap contained about 3.2% copper and 8% zinc. The rotary kiln was maintained at a temperature of 550° C. and the average residue time in the kiln was 3 minutes. The aqueous liquor in the leach tank 10 contained 15 grams per liter of ammonia as ammonium hydroxide and 15 grams per liter of ammonia as ammonium carbonate. The pH was kept at about 9.5. The concentration of copper in the leach liquor at the time of entry into the ion exchange extraction unit 14 was about 8 grams per liter. The volume ratio of the organic phase to the aqueous phase in the extraction units 14 was 2 organic to 1 aqueous. Two extraction units were employed with the aqueous phase and organic phase in countercurrent flow. The organic solvent employed was kerosene and the ion exchange reagent was about 5% by volume of the organic phase. The ion exchange reagent was a mixture of 2-hydroxy-5-dodecylbenzophenoxime and 5.8-diethyl-7-hydroxydodecane-6-oxime. The concentration of the copper in the organic phase prior to stripping was about 4.5 grams per liter. The volume ratio of the aqueous stripping solution to the organic phase in stripping units 26 was 1 to 1. Three stripping units were employed with the organic phase and aqueous phase in countercurrent flow. The stripping solution originally contained 200 grams per liter of sulfuric acid and no copper. Gradually the copper built up to 30 grams per liter and was maintained at this level thereafter. The copper concentration in the aqueous liquor removed from the stripping unit was about 35 grams per liter. The copper was recovered from this solution by electrolysis to produce pure copper.

The rotary kiln 22 was maintained at 325° C. and the zinc recovered as zinc oxide.

What is claimed is:

1. A process of recovering copper and zinc values from automobile scrap comprising the steps in combination of taking scrap after removal of the bulk of ferrous materials said scrap containing copper in an amount not over 5 weight percent, heating to remove organic materials and liquify the zinc values contained therein, separating at least a portion of the resulting liquified zinc as metal, recovering a copper enriched scrap portion and separating from the copper enriched scrap purified copper and any remaining purified zinc.

2. A process according to claim 1 comprising burning the organic materials at a temperature of at least 420° C.

3. A process according to claim 2 wherein the enriched copper scrap is leached with ammonia to separate copper and any remaining zinc from other metallic materials.

4. A process according to claim 3 wherein the ammoniacal solution is treated with a liquid ion exchange reagent to separate the copper from the zinc.

5. A process according to claim 4 wherein the liquid ion exchange reagent containing the copper is recirculated to the copper extraction to enrich the copper to at least 8 grams per liter.

6. A process according to claim 4 wherein the copper containing liquid ion exchange reagent is stripped of copper by contacting the liquid ion exchange reagent in organic solution with an aqueous liquid.

7. A process according to claim 6 wherein the aqueous solution is electrolyzed to recover electrically pure copper.

8. A process according to claim 2 wherein the organic materials are burned by passing through a rotary kiln maintained at 420 to 650° C. and the liquified zinc metal is recovered from the kiln.

9. A process according to claim 2 wherein the enriched copper scrap is leached with ammonia to separate the copper and any remaining zinc from other metallic material, the ammonical solution is treated with an ion exchange reagent in solution in a water immiscible organic solvent to separate the copper from the zinc and stripping the exchange reagent of the copper by contacting the organic solution thereof with a strongly acid aqueous liquid.

10. A process for recovering copper and zinc values from scrap derived from automobiles comprising subdividing the scrap, removing from the subdivided scrap the ferrous metals to produce an enriched scrap containing increased proportions of copper and zinc said enriched scrap containing copper in an amount not over 5 weight percent, heating the enriched scrap to a temperature of between 420 and 650° C. whereby the organic matter of the scrap is combusted, whereby the residue contains an increased proportion of copper, at least a portion of the zinc metal of the enriched scrap is liquified and the liquified zinc is separated from the scrap, contacting the residue with a leach liquid containing ammonia and ammonium carbonate and separating a pregnant leach liquid containing copper and zinc from the residue, contacting the pregnant leach liquor with an immiscible liquid organic copper ion exchange medium, whereby the copper is separated from the pregnant leach liquor and an essentially decopperized pregnant leach liquor is produced, evaporating a portion of the decopperized leach liquor to produce zinc oxide, contacting the said ion exchange medium containing the copper with an aqueous acid stripping medium whereby the copper is stripped from the said ion exchange medium and separating the copper from the said aqueous medium to produce purified copper.

References Cited

UNITED STATES PATENTS

| | | | |
|---|---|---|---|
| Re. 25,034 | 8/1961 | Proler | 75—44 |
| 1,669,485 | 5/1928 | Nordling | 75—44 |
| 2,059,229 | 11/1936 | Gregg | 75—44 |
| 2,366,007 | 12/1944 | D'Alelio | 23—50 |
| 3,224,873 | 12/1965 | Swanson | 75—101 |
| 3,291,598 | 12/1966 | Amano | 75—101 |
| 3,320,051 | 5/1967 | Lieberman | 75—63 |

FOREIGN PATENTS

| | | | |
|---|---|---|---|
| 592,862 | 2/1960 | Canada | 75—101 |

OTHER REFERENCES

Atkins & Garner, "Isotopic Exchange Reactions Of Zinc Chelate Complexes," pp. 3527–3529 (J.A.C.S., 1952).

L. DEWAYNE RUTLEDGE, Primary Examiner

P. D. ROSENBERG, Assistant Examiner

U.S. Cl. X.R.

75—117, 120